(12) United States Patent
De Francesco et al.

(10) Patent No.: US 7,866,389 B2
(45) Date of Patent: Jan. 11, 2011

(54) PROCESS AND APPARATUS FOR ENHANCED HYDROCARBON RECOVERY

(75) Inventors: Errico De Francesco, Newark, DE (US); Pietro Di Zanno, Rueil Malmaison (FR); Denis Cieutat, Neuilly sur Seine (FR); Guillaume De-Smedt, Antony (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 12 days.

(21) Appl. No.: 12/014,373

(22) Filed: Jan. 15, 2008

(65) Prior Publication Data

US 2008/0257543 A1    Oct. 23, 2008

(30) Foreign Application Priority Data

Jan. 19, 2007   (FR)   .................................... 0752778

(51) Int. Cl.
*E21B 43/24* (2006.01)
*E21B 36/00* (2006.01)
(52) U.S. Cl. .............. 166/272.4; 166/57; 166/75.12; 166/90.1; 166/267; 166/303; 166/371
(58) Field of Classification Search ............. None
See application file for complete search history.

(56) References Cited

U.S. PATENT DOCUMENTS

| 4,026,357 | A | * | 5/1977 | Redford | ............ 166/261 |
|---|---|---|---|---|---|
| 4,344,486 | A | | 8/1982 | Parrish | |
| 4,434,613 | A | | 3/1984 | Stahl | |
| 4,488,598 | A | | 12/1984 | Duerksen | |
| 4,498,537 | A | * | 2/1985 | Cook | ............ 166/257 |
| 4,861,576 | A | | 8/1989 | Stegelman | |
| 6,505,683 | B2 | | 1/2003 | Minkkinen et al. | |
| 6,662,872 | B2 | | 12/2003 | Gutek et al. | |
| 2005/0211434 | A1 | | 9/2005 | Gates et al. | |
| 2006/0243448 | A1 | | 11/2006 | Kresnyak et al. | |
| 2007/0199712 | A1 | | 8/2007 | Hocking | |

FOREIGN PATENT DOCUMENTS

| CA | 2325777 | | 5/2003 |
|---|---|---|---|
| FR | 2808223 | | 11/2001 |
| FR | 2885133 | A1 | 11/2006 |
| GB | 2425550 | A | 11/2006 |
| WO | 2001061167 | | 8/2001 |
| WO | 2004055323 | | 7/2004 |
| WO | 2006113982 | A1 | 11/2006 |
| WO | 2007098606 | | 9/2007 |

OTHER PUBLICATIONS

PCT Search Report and Written Opinion for PCT/EP2008/050436.

* cited by examiner

*Primary Examiner*—Zakiya W. Bates
(74) *Attorney, Agent, or Firm*—Elwood L. Haynes

(57) ABSTRACT

A method for recovering hydrocarbons from a reservoir includes separating air into a nitrogen-rich gas and an oxygen-rich gas, oxidizing a hydrocarbon fuel with at least part of the oxygen-rich gas to produce steam and a CO2-rich gas, injecting at least part of the steam through an injection well into the reservoir to heat the hydrocarbons, purging the injection well with at least part of the nitrogen-rich gas, and injecting at least part of the CO2-rich gas into the reservoir containing the heated hydrocarbons.

22 Claims, 3 Drawing Sheets

PROCESS AND APPARATUS FOR ENHANCED HYDROCARBON RECOVERY

CROSS-REFERENCE TO RELATED APPLICATIONS

This application claims the benefit of priority under 35 U.S.C. § 119(a) and (b) to French Application No. 07 52778, filed Jan. 19, 2007, which is herein incorporated by reference in its entirety.

BACKGROUND OF THE INVENTION

1. Field of the Invention

Embodiments of the invention relate to systems and methods for recovering hydrocarbons from a reservoir. Embodiments disclosed herein are particularly useful, for example, in recovering heavy oil and bitumen.

2. Description of the Related Art

Grades of oil are generally separated into classes according to viscosity, density, and sulfur content. The higher the viscosity and density of the oil, the more difficult to produce the oil from reservoirs to the surface. In particular, extra heavy oil (EHO) and bitumen require production enhancement techniques for production. In the following description, the generic term "oil" may be used in reference to extra heavy oil and bitumen, but also applies to less viscous grades of oil.

A large portion of the world's potential oil reserves are in the form of extra heavy oil and bitumen, such as the Orinoco Belt in Venezuela and oil sands in Alberta, Canada. Currently, existing bitumen and extra heavy oil reservoirs are exploited using enhanced thermal recovery techniques or solvent based techniques resulting in efficiency of recovery in the range of between 20 and 25%. The most common thermal technique is steam injection in which heat enthalpy from the steam is transferred to the oil by condensation. The heating reduces the viscosity of the oil to allow gravity drainage and collection. Injection may be achieved by the well known cyclic steam simulation (CSS) and Steam Assisted Gravity Drainage (SAGD).

In SAGD, two primary wells are drilled into the reservoir: a production well and an injection well. The injection well is used to inject steam and various gases into the reservoir. Production of hydrocarbons though the production well results from the reduced viscosity and higher temperature and pressure resulting from the injections.

The costs and environmental impact of recovering the extra heavy oil and bitumen is an ongoing concern. The steam generators require significant amounts of fuel to produce sufficient amounts of steam to stimulate production. The ratio of steam to oil produced ("steam on oil ratio" or SOR) using current techniques ranges from 1.4 to 4. In other words, 1.4 to 4 gallons of water must be evaporated into steam for each gallon of oil produced from the reservoir. In addition to the fuel consumed, much of the water is lost to the reservoir. What water returns to the surface with the produced oil must be treated to remove contaminants, such as heavy metals and sulfur. The treatment of water further adds to the cost of production.

Greenhouse gas emissions from steam generation are also of concern. As an example, approximately 8,000 to 15,000 tons of carbon dioxide ($CO_2$) may be generated daily to produce injection steam and produce 100,000 barrels of oil per day (BOPD) of bitumen. Reduction in $CO_2$ and other greenhouse gas emissions would lessen the environmental impact from extra heavy oil and bitumen production.

Vapor extraction (VAPEX) is another technique for enhancing production of extra heavy oil and bitumen. The VAPEX process involves injecting a gaseous hydrocarbon solvent into the reservoir where it dissolves into the oil, thereby reducing viscosity and allowing drainage into a lower horizontal well for extraction. Typical hydrocarbon solvents include propane, butane, or $CO_2$ with a carrier gas. Currently, VAPEX alone, without also heating the reservoir, produces small improvements in oil recovery. The hydrocarbon solvents are expensive and a large percentage is lost in the reservoir during production.

SUMMARY OF THE INVENTION

In one aspect, embodiments of the invention relate to a method for recovering hydrocarbons from a reservoir. The method includes separating air into a nitrogen-rich gas and an oxygen-rich gas, oxidizing a hydrocarbon fuel with at least part of the oxygen-rich gas to produce steam and a CO2-rich gas, injecting at least part of the steam through an injection well into the reservoir to heat the hydrocarbons, purging the injection well with at least part of the nitrogen-rich gas, and injecting at least part of the CO2-rich gas into the reservoir containing the heated hydrocarbons.

In another aspect, embodiments of the invention relate to a system for recovering hydrocarbons from a reservoir. The system includes an air separation unit configured to separate air into at least a nitrogen-rich gas and an oxygen-rich gas, an oxidation unit configured to oxidize a hydrocarbon fuel using the oxygen-rich gas. The oxidation unit provides heat for producing steam and produces a CO2-rich gas, and is configured to oxidize the hydrocarbon fuel in the absence of an atmospheric air supply. The system further includes an injection well in fluid communication with the produced steam, the CO2-rich gas, and the nitrogen-rich gas.

In another aspect, embodiments of the invention relate to a method for recovering hydrocarbons from a reservoir. The method includes separating air into a nitrogen-rich gas and an oxygen-rich gas, oxidizing a hydrocarbon fuel with at least part of the oxygen-rich gas to produce steam and a CO2-rich gas, and injecting the steam into the reservoir to produce hydrocarbons for a period of time to heat the hydrocarbons. After stopping the injection of the steam, the nitrogen-rich gas is injected into the reservoir. After stopping the injection of the nitrogen-rich gas, the CO2-rich gas is injected into the reservoir while the hydrocarbons remain sufficiently heated to enhance recovery.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention generally provide systems and methods for recovering hydrocarbons from a reservoir. Embodiments disclosed herein are particularly useful, for example, in recovering heavy oil and bitumen, but may also be used to recover less viscous grades of oil or various oil-bearing products.

Figure 1:
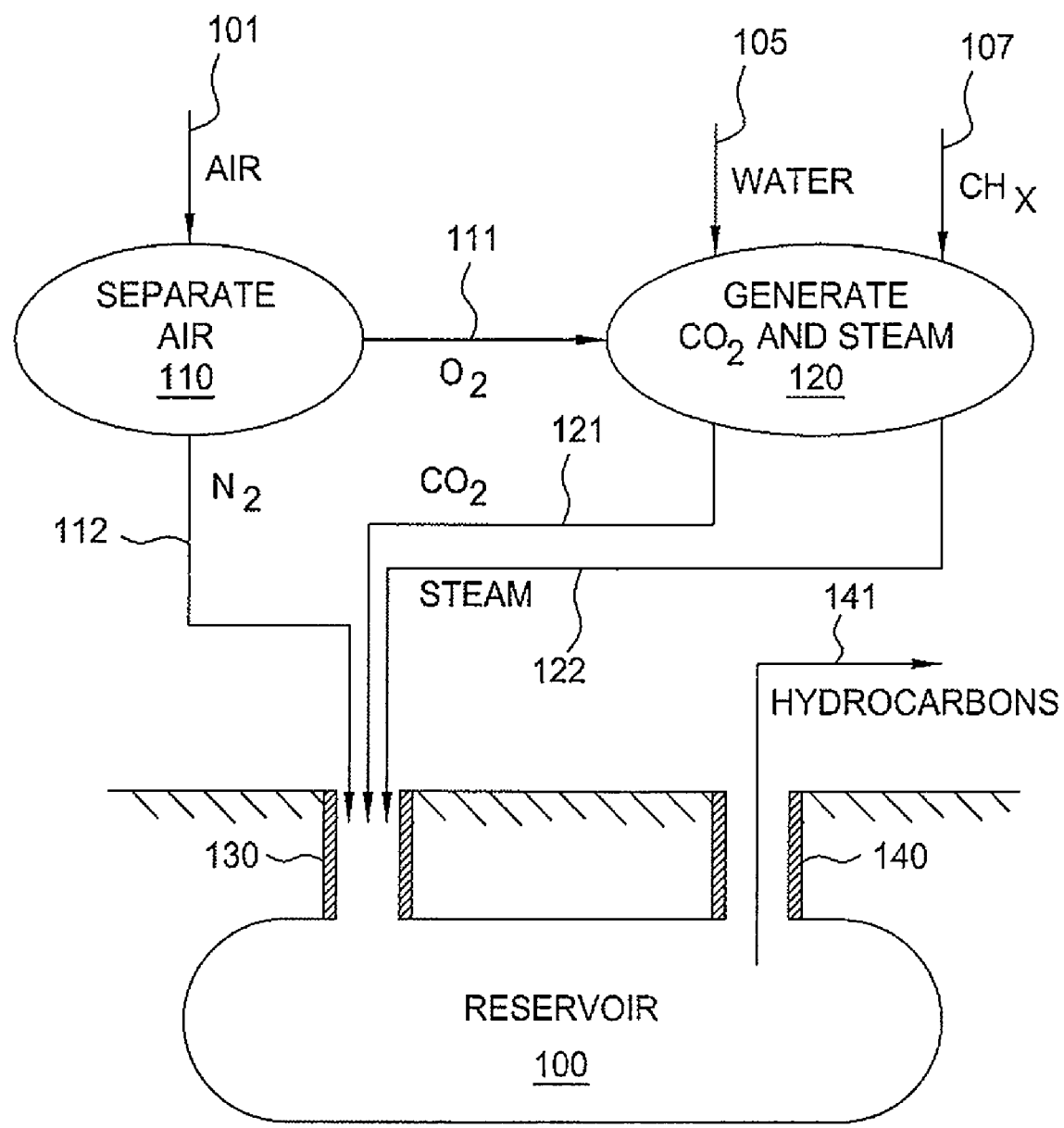
FIG. 1 shows a recovery process for recovering hydrocarbons from an underground reservoir in accordance with an embodiment of the invention.

FIG. 1 shows a recovery process for recovering hydrocarbons, according to one embodiment. In general, hydrocarbons (oil) 141 are recovered from a reservoir 100 by injecting a combination of steam 122, carbon dioxide 121, and nitrogen 112 into the reservoir 100 using an injection well 130. Hydrocarbons 141 are produced from the reservoir 100 using a production well 140. The relative locations of the injection well 130 and the production well 140 are for illustrative purposes only. Those having ordinary skill in the art will appreciate that the particular arrangements for injection and production may vary according to the reservoir and its contents without departing from the scope of the invention.

According to one embodiment, the nitrogen 112 is derived from an air separation process 110, which receives and separates air 101 into constituent components, illustratively, nitrogen 112 and oxygen 111. At least a portion of the oxygen is provided to a carbon dioxide and steam generation process 120, which produces at least a portion of the carbon dioxide 121 and steam 122 injected into the reservoir 100 to facilitate hydrocarbon recovery. In particular, the carbon dioxide and steam generation process oxidizes a carbonaceous material 107 using the oxygen 111 provided by the separation process 110. The carbonaceous material 107 may be, for example, a hydrocarbon (CHx). In one embodiment, the carbon dioxide is generated by a combustion process, while in another embodiment, the carbon dioxide is generated in a thermal conversion process. In one embodiment, a least a portion of the carbonaceous material 107 being oxidized is provided from the hydrocarbons 141 recovered from the reservoir 100. To this end, a hydrocarbon separation process (not shown) may be applied to the recovered hydrocarbons 141, thereby providing the carbonaceous material for the carbon dioxide and steam generation process. Steam 122 is generated from heat created by the carbon dioxide generation, or from the burning of gases produced during the carbon dioxide generation.

Figure 2:
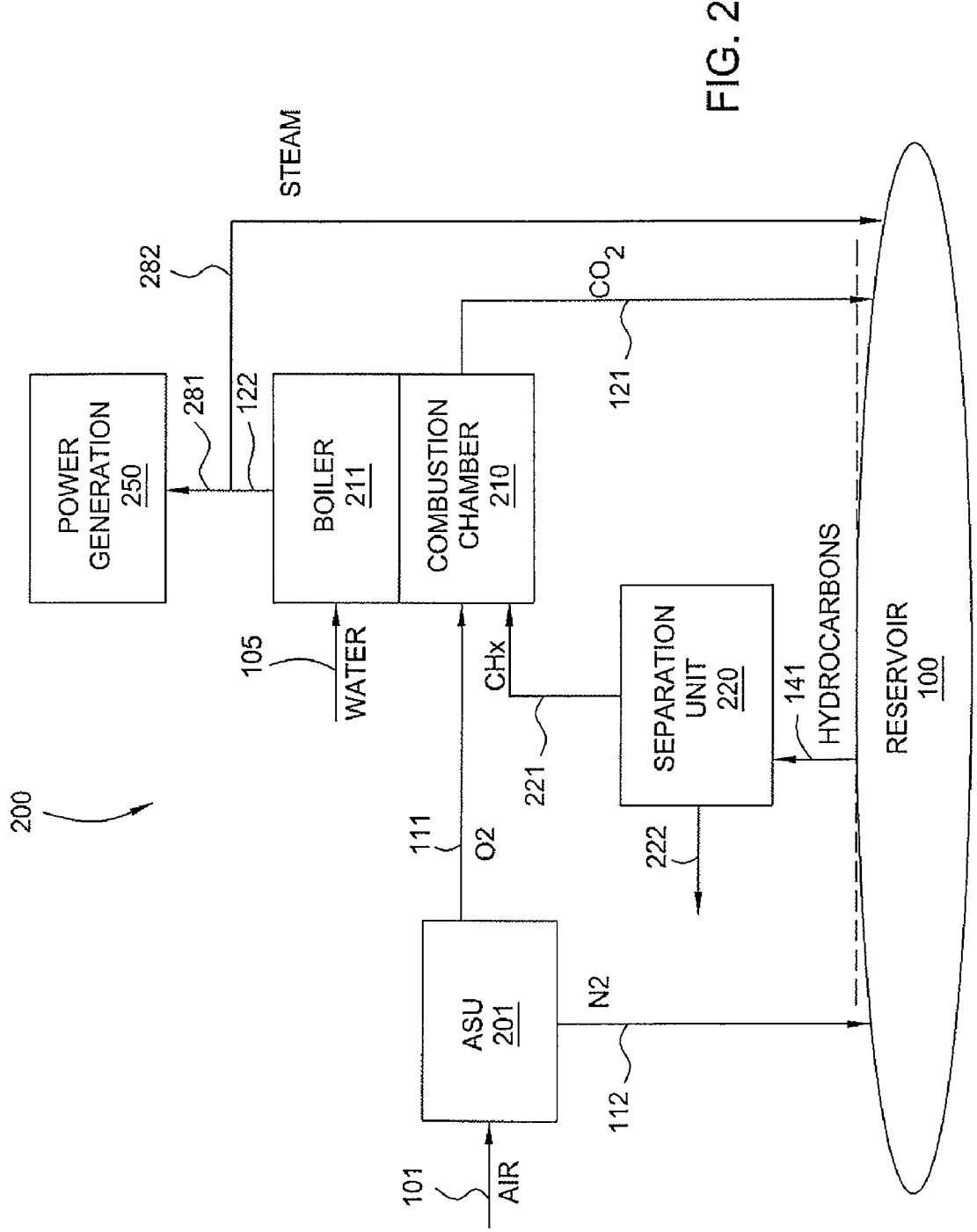
FIG. 2 is a schematic of a system for recovering hydrocarbons from a reservoir in accordance with an embodiment of the invention.

In FIG. 2, a system 200 for recovering hydrocarbons in accordance with an embodiment of the invention is shown. An air separation unit (ASU) 201 separates air 101 into primary gases: an oxygen-rich gas 111 and a nitrogen-rich gas 112. As used herein, "oxygen-rich" and "nitrogen-rich" mean that the gas contains at least 50% by volume of oxygen and nitrogen, respectively. Any ASU capable of producing both oxygen-rich and nitrogen-rich gases may be used, such as, for example, a cryogenic ASU. The oxygen-rich gas 111 may be, for example, greater than 90% $O_2$ by volume. The nitrogen-rich gas 112 may be, for example, greater than 90% $N_2$ by volume. From the ASU 201, the oxygen-rich gas 111 is fed into a combustion chamber 210 to provide oxygen for combustion, which results in more complete combustion to provide primarily water and $CO_2$. In one embodiment, the oxygen-rich gas 111 is substantially pure oxygen (greater than 90%) and the combustion chamber 210 is an oxycombustion chamber without an inlet for atmospheric air. In oxycombustion, substantially pure oxygen is used for combustion of a hydrocarbon fuel. Depending on the purity of the oxygen and the hydrocarbon fuel, the output from the oxycombustion chamber is almost entirely $CO_2$ and water in a gas form.

Flue-gas from the combustion chamber 210 provides $CO_2$-rich gas 121 to be used in enhancing oil recovery from the reservoir 100. The $CO_2$ content of the $CO_2$-rich gas 121 may be, for example, greater than 90% $CO_2$ by volume. In an embodiment using the oxycombustion chamber, the $CO_2$-rich gas 121 can be high purity $CO_2$ (greater than 99.5% $CO_2$) or may contain minimal, but useful impurities. To provide high purity $CO_2$, the $CO_2$-rich gas 121 may be further purified using various commercially available techniques, such as, for example, membrane include at least 90% $CO_2$, up to 3% $O_2$, COS, and varying amounts of $NO_x$ and $SO_x$ depending on the composition of the hydrocarbon fuel 221. The $O_2$ helps to produce surface active agents (surfactants) in-situ by oxidizing a small part of the hydrocarbons, such as bitumen, in the reservoir 100. The produced surfactants may further improve hydrocarbon recovery through surfactant flooding, which lowers the interfacial tension between the oil and water in the reservoir to produce an emulsion. $NO_x$ and $SO_x$ help to reduce the pH of water produced and contribute to water/oil emulsion stability and suspensions stability during hydrocarbon recovery. Treatment of the produced water typically includes reducing the pH. Accordingly, the prior reduction in pH by $NO_x$ and $SO_x$ may reduce the need for additional treatment of the produced water, thereby reducing costs.

Various fuel sources (CHx) may be used in the combustion chamber 210. According to one embodiment, the hydrocarbon fuel 221 used in the combustion chamber 210 is provided from a separation unit 220. Illustratively, the separation unit 220 receives recovered hydrocarbons 141 from the reservoir 100 and separates these hydrocarbons into two or more constituents (fractions). In a particular embodiment, the separation unit 220 separates the recovered hydrocarbons 141 into heavy fractions 221 and light fractions 222. As used in the art, "fractions" are grouped according to molecular weight of the hydrocarbon chains, which correlates with viscosity and boiling point. Light fractions have a sufficiently low viscosity suitable for transport in a pipeline. Heavy fractions, such as asphaltene, are highly viscous and difficult to transport or refine into fuel. At least a portion of the heavy fractions 221 are provided to the combustion chamber 210 as the fuel used to oxidize the oxygen-rich gas 111. Light fractions 222, which are more suitable for refining into fuel, are transported elsewhere for use.

The combustion chamber 210 is used to heat incoming water 105 into steam 122 in a boiler 211. Part 281 of the steam 122 may be used in various other functions, such as power generation 250 in a turbine (not shown) or to provide desalinated water. Part 282 of the steam 122 is injected into the reservoir 100 to enhance recovery.

The embodiment shown in FIG. 2 provides three components for enhancing the recovery of hydrocarbons from the reservoir 100. Part 282 of the steam 122 is used to heat the hydrocarbons in-situ, thereby lowering the viscosity and beginning production of hydrocarbons 141 from the reservoir 100. The $CO_2$-rich gas 121 (flue gas from the combustion chamber 210) is injected into the reservoir as a hydrocarbon solvent, thereby further lowering the viscosity of the hydrocarbons in the reservoir. The higher temperature of the hydrocarbons in the reservoir 100 from the steam injection increases the solubility of the $CO_2$-rich gas 121. The nitrogen-rich gas 112 from the ASU 201 provides an immiscible fluid (non-soluble) to re-pressurize the reservoir 100 and to dry out the injection well. The nitrogen injection step between steam and $CO_2$-rich gas injections reduces the amount of carbonic acid forming in the injection well. Carbonic acid, over time, severely corrodes metals and composites used for tubing and casing in the injection well. The nitrogen acts to purge the injection well of steam before $CO_2$-rich gas is injected, and vice versa. Although the steam, nitrogen-rich gas, and $CO_2$-rich gas injections may overlap, the separation of steam and $CO_2$-rich gas injections by an intervening nitrogen-rich gas injection will reduce the formation of carbonic acid, thereby reducing corrosion of the casing and tubing within the injection well. As a result of the reduced corrosion, the service life of the casing and tubing is increased.

The injection of the steam, the nitrogen-rich gas, and the $CO_2$-rich gas may be carried out in a cycle to recover hydrocarbons from the reservoir. First, steam injection is performed to heat the hydrocarbons in the reservoir and begin hydrocarbon production. The temperature necessary to begin production may vary according to the properties of the hydrocarbons and the pressure of the reservoir. For example, hydrocarbon production may begin when a portion of the hydrocarbons in the reservoir reach between 100° C. and 180° C. Also, the duration of steam injection may vary widely according to the particular properties of the reservoir and the hydrocarbons contained therein. In one embodiment, a steam injection may continue 5 to 10 days, for example. The amount of steam injected may be, for example, 1 to 3 times by volume the amount of oil produced. Steam injection may be performed repeatedly in regular or irregular intervals. Later repeats of the steam injection may be shorter in duration and quantity relative to barrels of oil produced. After the steam injection, the nitrogen-rich gas is injected (immiscible flooding) to purge conduits and to re-pressurize the reservoir. The amount of nitrogen-rich gas injected may be, for example, 0.1 to 2 times by weight the amount of oil produced.

With the hydrocarbon production continuing from the steam injection, the $CO_2$-rich gas is injected into the reservoir (miscible flooding). Because of the increased temperature, the $CO_2$ is more effective as a solvent to further reduce the viscosity of the hydrocarbons. The amount of injected $CO_2$ may be, for example, 0.5 to 3 times by weight the amount of oil produced. However, for emissions purposes, all of the $CO_2$-rich flue gas produced by combustion may be injected into the reservoir. Any loss of the solvent ($CO_2$) is an advantage of this approach because the $CO_2$ is sequestered underground rather than emitted into the atmosphere. In addition to the ecological benefit of $CO_2$ sequestration, environment regulatory schemes may provide an economic benefit by creating carbon credits for trading, tax deductions, etc.

Following injection of the $CO_2$-rich gas, additional nitrogen-rich gas may be injected into the reservoir to clean the conduits and re-pressurize the reservoir. The above injection steps may then be repeated in cycle to continue production of oil from the reservoir.

Figure 3:
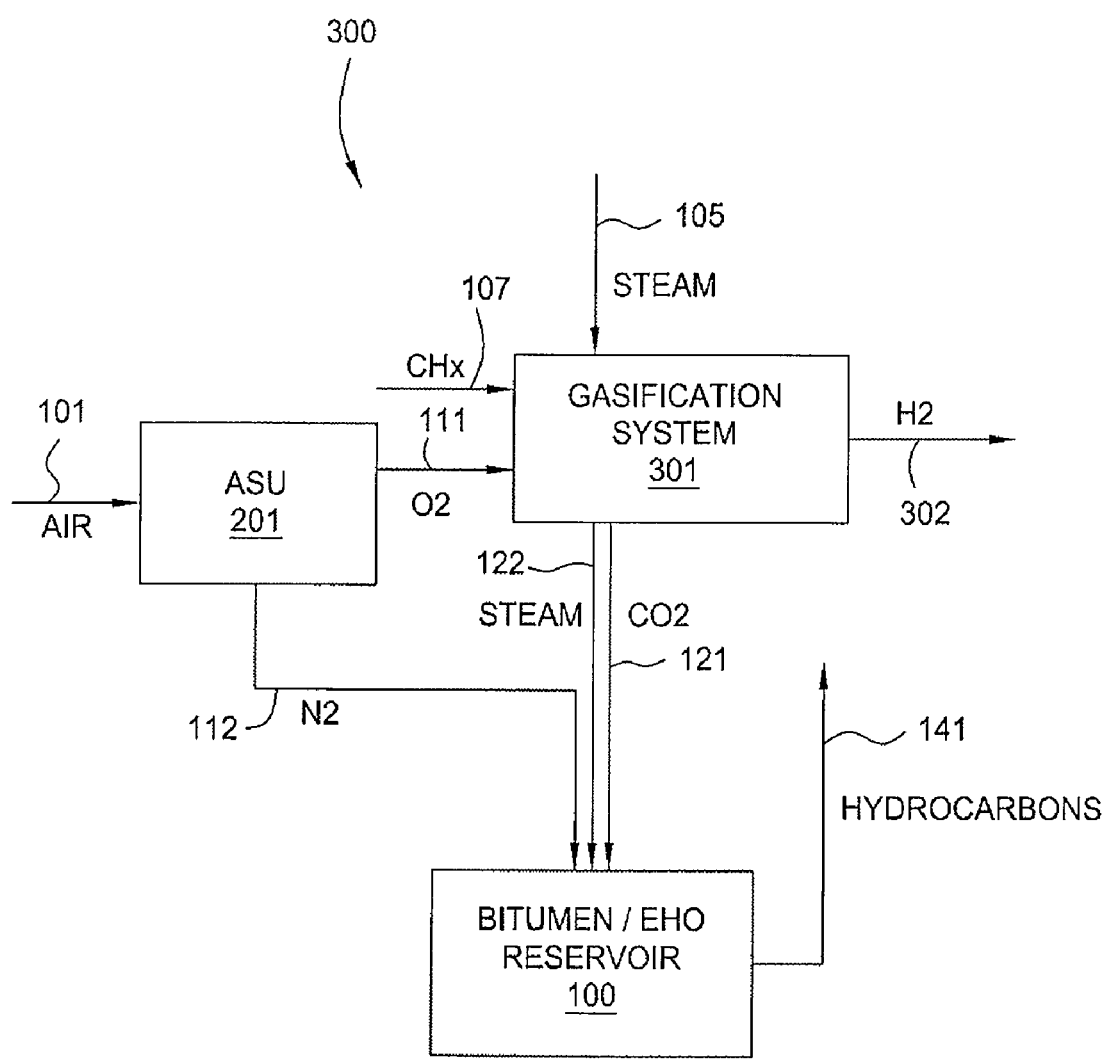
FIG. 3 is a schematic of a system for recovering hydrocarbons from a reservoir in accordance with an embodiment of the invention.

Turning to FIG. 3, a system 300 for recovering hydrocarbons in accordance with an embodiment of the invention is shown. The system 300 of FIG. 3 is similar in arrangement to the system shown in FIG. 1 and is capable of performing the above described methods. However, rather than oxidizing hydrocarbon fuel CHx by combustion, the system 300 uses a gasification system 301 to provide heat for the production of steam 122 and $CO_2$-rich gas 121. Gasification processes are well known in the art for use in refining and cleaner electricity production from coal and other hydrocarbons. Accordingly, gasification is only briefly described below. Gasification systems suitable for use with embodiments of the invention include, for example, a counter-current fixed bed ("up draft") gasifier, a co-current fixed bed ("down draft") gasifier, a fluidized bed gasifier, and an entrained flow gasifier. Those having ordinary skill in the art will appreciate that embodiments of the invention are not limited to any particular gasification system.

Gasification is a thermal conversion of carbonaceous materials, such as hydrocarbons (CHx), at high temperatures with a limited supply of substantially pure oxygen 111 (e.g., greater than 90% by volume) and steam 105 into a synthetic gas ("syngas"). Syngas typically includes carbon monoxide (CO), hydrogen gas, and water vapor. A shift reactor (which may be component of the gasification system 201) may continue the process to convert the CO into $CO_2$-rich gas 121 for injection into the reservoir 100. In the shift reactor, CO and water react at high temperatures (e.g., 350° C. to 400° C. to create $CO_2$ and hydrogen. The reaction may be aided by a catalyst, such as magnetite ($Fe_3O_4$) and transition metal oxides. Hydrogen gas 202 from the gasification process may be separated from the other gases using permeable membranes. The hydrogen gas 202 can be used, for example, as fuel in a turbine or for hydrogenation of bitumen for upgrading. In one embodiment, rather than injecting all of the steam 122 into the reservoir, some portion may be re-circulated into the gasification system 201 to continue to feed the gasification process.

In an embodiment using the gasification process, the $CO_2$-rich gas 121 may contain minimal, but useful impurities. The $CO_2$-rich gas 121 can be high purity $CO_2$, or, for example, the composition of the $CO_2$-rich gas 121 may be, in one embodiment, at least 90% $CO_2$, with the remaining portion being primarily $H_2S$ and $CH_4$. The $CO_2$-rich gas 121 may further include traces of $NH_3$, COS, and $CS_2$. The impurities in the $CO_2$-rich gas 121 may help in re-pressurizing the reservoir 100. $H_2S$ lowers the pH of produced water, which, as noted above, reduces costs associated with the treatment of produced water. $CH_4$ improves gas/oil miscibility by serving as a hydrocarbon solvent.

Gasification is able to utilize nearly any carbon-based material and with less air pollutants than combustion. Suitable fuels includes biomass, heavy fractions of produced bitumen or extra heavy oil, natural gas, coke, coal, petroleum coke (petcoke), and any combination thereof. Typically, the upgrading occurs at a refinery; however, by providing hydrogen gas at the production site the upgrading can take place before transporting. As a result, the produced hydrocarbons are more readily transported and later hydrogen gas production at the refinery is reduced or unnecessary.

The above described embodiments may provide one or more of the following advantages. The process in FIG. 1 and the systems in FIGS. 2 and 3 provide an efficient use for what are often considered byproducts in bitumen and heavy oil production. Rather than wasting separated nitrogen-rich gas, that gas can be used for immiscible flooding of the reservoir and conduits to re-pressurize the reservoir and reduce corrosion. The separated oxygen-rich gas is used to enhance combustion used for steam production or in a gasification process, both of which provide a $CO_2$-rich gas that can be injected into the reservoir as a hydrocarbon solvent. Unlike the use of light hydrocarbons as solvents, the loss of $CO_2$-rich gas in the reservoir may provide a separate economic and environmental advantage, according to one embodiment. Further, using processes according to embodiments of the invention, the amount of steam required for production of each barrel of oil may be reduced (relative to other steam-based processes such as SAGD), thereby reducing water and energy costs relative to the amount of oil produced.

While the foregoing is directed to embodiments of the invention, other and further embodiments of the invention may be devised without departing from the basic scope thereof, and the scope thereof is determined by the claims that follow.

What is claimed is:

1. A method for recovering hydrocarbons from a reservoir, comprising:
   separating air into a nitrogen-rich gas and an oxygen-rich gas;
   oxidizing a hydrocarbon fuel with at least part of the oxygen-rich gas to produce steam and a $CO_2$-rich gas, wherein the $CO_2$-rich gas is flue gas produced by injecting the oxygen-rich gas into a combustion chamber; and sequentially
   injecting at least part of the steam through an injection well into the reservoir to heat the hydrocarbons, then;
   purging the injection well with at least part of the nitrogen-rich gas; and then
   injecting at least part of the $CO_2$-rich gas into the reservoir containing the heated hydrocarbons.

2. The method of claim 1, wherein the steam and the $CO_2$-rich gas are not injected at the same time and are separated by the purging.

3. The method of claim 2, wherein the amount of steam injected into the reservoir is less than about 3 times by weight an amount of hydrocarbons recovered from the reservoir.

4. The method of claim 2, wherein the amount of $CO_2$-rich gas injected into the reservoir is less than about 10% by weight of the amount of steam injected into the reservoir.

5. The method of claim 1, wherein the combustion chamber is configured for oxycombustion.

6. The method of claim 1, wherein the steam and the $CO_2$-rich gas are produced by a gasification process using the hydrocarbon fuel.

7. The method of claim 6, wherein hydrogen gas from the gasification process is separated.

8. The method of claim 7, wherein at least part of the hydrogen gas is used to upgrade hydrocarbons recovered from the reservoir.

9. The method of claim 1, wherein the hydrocarbon fuel used to produce the steam and the $CO_2$-rich gas is at least in part from the reservoir.

10. The method of claim 1, wherein the reservoir contains at least one of the group consisting of heavy oil, extra heavy oil, and bitumen.

11. The method of claim 1, wherein the oxygen-rich gas comprises greater than about 90% by volume of oxygen.

12. The method of claim 1, wherein the nitrogen-rich gas comprises greater than about 90% by volume of nitrogen.

13. The method of claim 1, wherein the $CO_2$-rich gas comprises greater than about 90% by volume of $CO_2$.

14. The method of claim 13, wherein the $CO_2$-rich gas comprises at least one from the group consisting of $O_2$, $NO_x$, and $SO_x$.

15. The method of claim 14, wherein the $CO_2$-rich gas comprises about 0.1% to about 3% by volume of $O_2$.

16. The method of claim 13, wherein the $CO_2$-rich gas comprises at least one from the group consisting of $H_2S$ and $CH_4$.

17. The method of claim 16, wherein the $CO_2$-rich gas comprises at least one from the group consisting of $NH_3$, COS, and $CS_2$.

18. The method of claim 13, wherein the $CO_2$-rich gas comprises greater than about 99.5% by volume of $CO_2$.

19. A system for recovering hydrocarbons from a reservoir, comprising:
   an air separation unit configured to separate air into at least a nitrogen-rich gas and an oxygen-rich gas;
   an oxidation unit configured to oxidize a hydrocarbon fuel using the oxygen-rich gas, wherein the oxidation unit provides heat for producing steam and produces a $CO_2$-rich gas, and wherein the oxidation unit is configured to oxidize the hydrocarbon fuel in the absence of an atmospheric air supply;
   an injection well in fluid communication with the produced steam, the $O_2$-rich gas, and the nitrogen-rich gas;
   wherein the oxidation unit comprises a combustion chamber configured for oxycombustion.

20. The system of claim 19, wherein the oxidation unit comprises a gasification system.

21. A method for recovering hydrocarbons from a reservoir, comprising:
   separating air into a nitrogen-rich gas and an oxygen-rich gas;
   oxidizing a hydrocarbon fuel with at least part of the oxygen-rich gas to produce steam and a $CO_2$-rich gas;
   injecting the steam into the reservoir to produce hydrocarbons for a period of time to heat the hydrocarbons;
   after stopping the injection of the steam, injecting the nitrogen-rich gas into the reservoir;
   after stopping the injection of the nitrogen-rich gas, injecting the $CO_2$-rich gas into the reservoir while the hydrocarbons remain sufficiently heated to enhance recovery;
   wherein the $CO_2$-rich gas is flue gas produced by injecting the oxygen-rich gas into a combustion chamber.

22. The method of claim 21, wherein the steam and the $CO_2$-rich gas are produced by a gasification process using the hydrocarbon fuel.

* * * * *

UNITED STATES PATENT AND TRADEMARK OFFICE
CERTIFICATE OF CORRECTION

| | | |
|---|---|---|
| PATENT NO. | : 7,866,389 B2 | Page 1 of 1 |
| APPLICATION NO. | : 12/014373 | |
| DATED | : January 11, 2011 | |
| INVENTOR(S) | : E. De Francesco et al. | |

It is certified that error appears in the above-identified patent and that said Letters Patent is hereby corrected as shown below:

In Column 8, line 27, replace the word "$O_2$-rich" with the word --$CO_2$-rich--.

Signed and Sealed this
Fourteenth Day of June, 2011

David J. Kappos
*Director of the United States Patent and Trademark Office*